(12) United States Patent
Choi

(10) Patent No.: US 10,384,670 B2
(45) Date of Patent: *Aug. 20, 2019

(54) METHOD OF CONTROLLING HYBRID VEHICLE IN CASE OF SLIP OF MHSG DRIVE BELT

(71) Applicants: HYUNDAI MOTOR COMPANY, Seoul (KR); KIA MOTORS CORPORATION, Seoul (KR)

(72) Inventor: Kwang-Seok Choi, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 1 day.

This patent is subject to a terminal disclaimer.

(21) Appl. No.: 15/811,334

(22) Filed: Nov. 13, 2017

(65) Prior Publication Data

US 2018/0170358 A1    Jun. 21, 2018

(30) Foreign Application Priority Data

Dec. 16, 2016 (KR) .................. 10-2016-0172581

(51) Int. Cl.
*B60W 20/30* (2016.01)
*B60K 6/485* (2007.10)
(Continued)

(52) U.S. Cl.
CPC ............ *B60W 20/30* (2013.01); *B60K 6/485* (2013.01); *B60W 20/10* (2013.01); *B60W 20/50* (2013.01); *B60W 50/038* (2013.01); *B60W 50/14* (2013.01); *B60K 2006/4833* (2013.01); *B60W 30/18127* (2013.01); *B60W 2510/0241* (2013.01); *B60W 2510/0275* (2013.01); *B60W 2510/0638* (2013.01); *B60W 2510/0676* (2013.01); *B60W 2510/081* (2013.01); *B60W 2510/083* (2013.01); *B60W 2510/18* (2013.01); *B60W 2710/025* (2013.01);
(Continued)

(58) Field of Classification Search
None
See application file for complete search history.

(56) References Cited

U.S. PATENT DOCUMENTS

2010/0219007 A1* 9/2010 Dalum .................. B60W 20/10
180/65.22
2018/0174374 A1* 6/2018 Choi ...................... G07C 5/006

FOREIGN PATENT DOCUMENTS

KR      10-1338463 B1    12/2013
KR      10-1583971 B1     1/2016

* cited by examiner

*Primary Examiner* — Richard M Camby
(74) *Attorney, Agent, or Firm* — Knobbe Martens Olson & Bear LLP

(57) ABSTRACT

A method of controlling a hybrid vehicle in case of slip of a Mild Hybrid Starter Generator (MHSG) drive belt is disclosed. The method may include determining an amount of torque assistance or an amount of regenerative braking according to the MHSG while the vehicle travels; instructing the MHSG to output a desired amount of torque, based on the amount of torque assistance or the amount of regenerative braking; detecting an output torque from the MHSG to compare the output torque with the desired amount of torque; and determining that slip occurs in the MHSG drive belt when a difference between the actual torque and the desired amount of torque exceeds a preference value, and performing control for slip prevention.

7 Claims, 4 Drawing Sheets

(51) Int. Cl.
    *B60W 50/038*     (2012.01)
    *B60W 50/14*     (2012.01)
    *B60W 20/10*     (2016.01)
    *B60W 20/50*     (2016.01)
    *B60W 30/18*     (2012.01)
    *B60K 6/48*     (2007.10)

(52) U.S. Cl.
    CPC . *B60W 2710/027* (2013.01); *B60W 2710/083* (2013.01); *Y02T 10/6226* (2013.01)

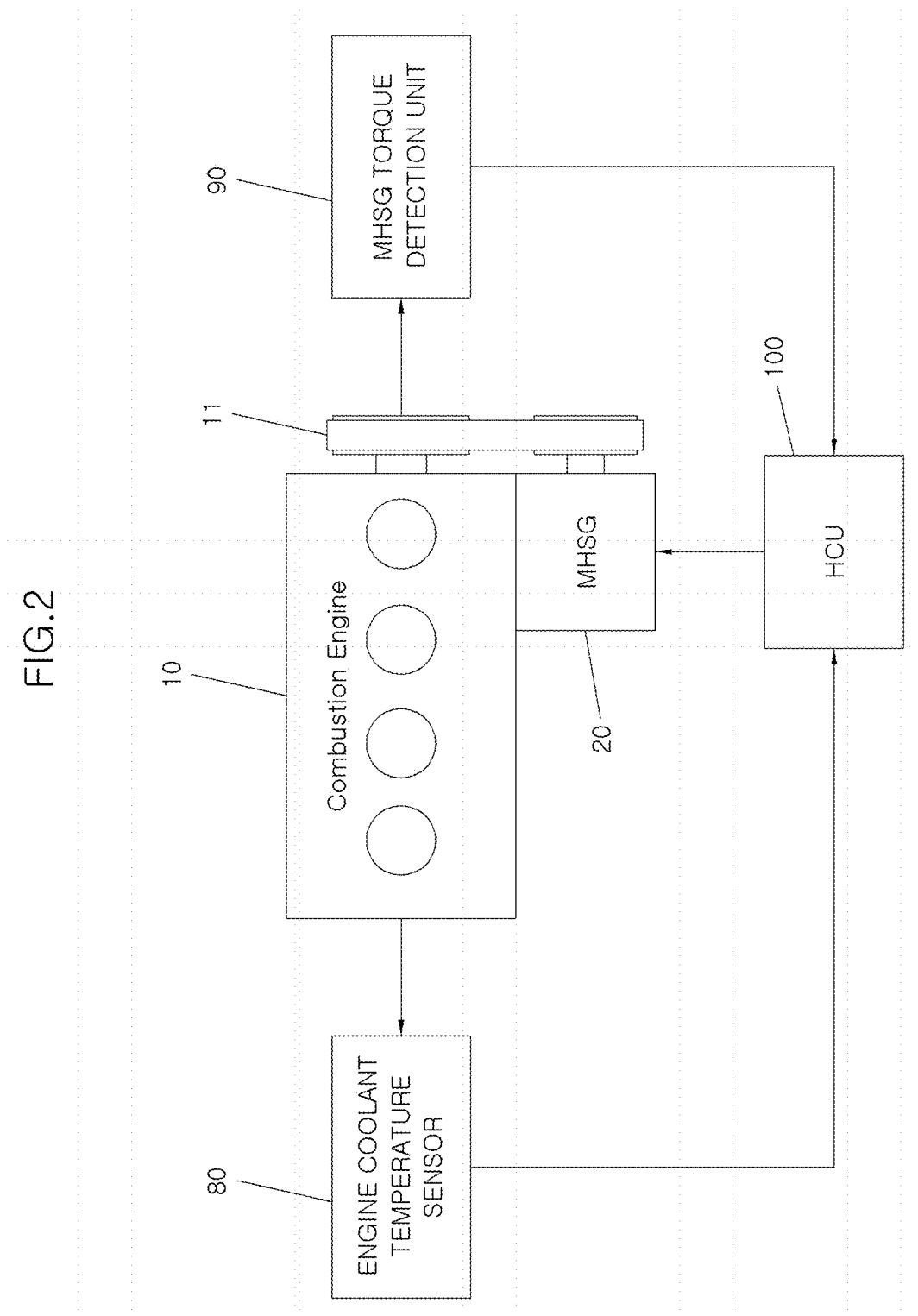

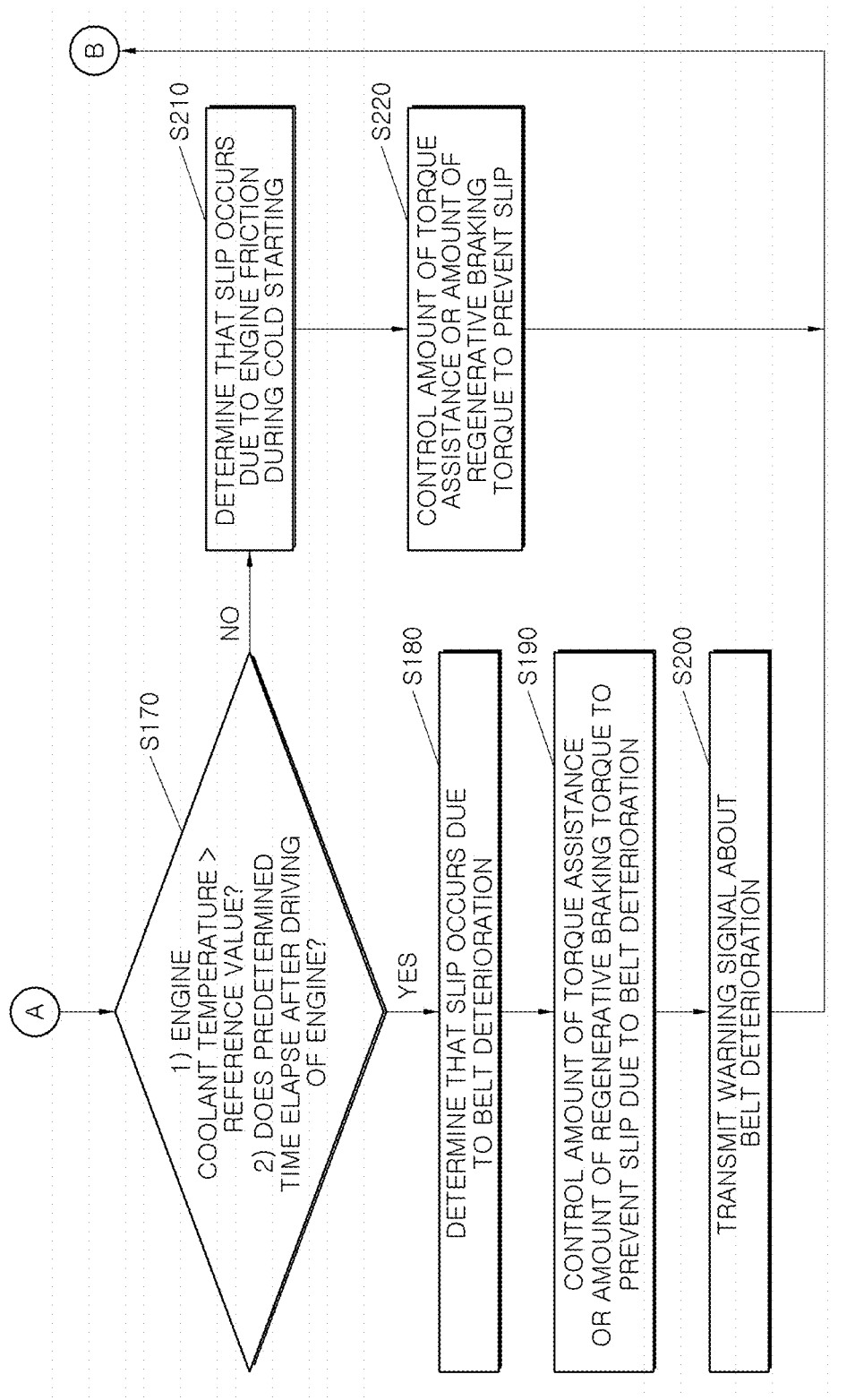

METHOD OF CONTROLLING HYBRID VEHICLE IN CASE OF SLIP OF MHSG DRIVE BELT

CROSS-REFERENCE(S) TO RELATED APPLICATIONS

This application claims priority to Korean Patent Application No. 10-2016-0172581, filed on Dec. 16, 2016 which is incorporated herein by reference in its entirety.

BACKGROUND

Field

Embodiments of the present invention relate to a method of controlling a mild hybrid vehicle in case of slip of an MHSG (Mild Hybrid Starter Generator) drive belt; and, particularly, to a method of determining whether slip occurs in a belt for transmitting driving force between an engine and an electric motor, and a control method for effectively coping with when slip is determined to occur.

Description of Related Art

In recent years, hybrid vehicles have been actively researched and developed to improve fuel efficiency and protect environments. Hybrid vehicles are largely classified into a typical hybrid vehicle and a plug-in hybrid vehicle according to the charging method thereof. The typical hybrid vehicle is a hybrid vehicle in which a battery is charged using a portion of energy generated by an internal combustion engine. The plug-in hybrid vehicle is a hybrid vehicle in which a battery is charged by energy supplied from an external commercial power source.

Particularly, a mild hybrid system is a system that is not provided with a traveling mode, in which a vehicle is driven only by a drive motor, but provides the torque required for traveling to a vehicle using a hybrid starter generator (HSG) having a faster response speed than an engine in order to obtain a momentary high torque when the vehicle accelerates in a stop state or when the vehicle accelerates for overtaking while traveling, as disclosed in Patent Document 1.

Meanwhile, in a mild hybrid vehicle that performs torque assistance and regenerative braking while traveling by the driving force of a motor, the driving force is transmitted from the motor to an engine by a belt connecting them. Accordingly, the belt may often slip while the vehicle is traveling, and the torque transmission efficiency of the motor may be lowered in case of the belt slip. Hence, it is difficult to improve power performance and fuel efficiency by functions of hybrid electric vehicles (HEVs). Moreover, there is a problem in that driving sensitivity is adversely affected due to occurrence of noise and rpm variation in case of the belt slip.

However, the method of determining whether a drive belt slips and the control method for coping with when the slip is determined to occur in a mild hybrid vehicle have not been sufficiently studied to the present time.

PRIOR ART DOCUMENT

Korean Patent No. 10-1583971 (Jan. 21, 2016)

The disclosure of this section is to provide background of the invention. Applicant notes that this section may contain information available before this application. However, by providing this section, Applicant does not admit that any information contained in this section constitutes prior art.

SUMMARY

An embodiment of the present invention is directed to a control method for accurately determining whether a drive belt slips and suppressing the slip of the drive belt in a hybrid vehicle that includes an MHSG, engine, and the drive belt connecting them.

Other aspects and advantages of the present invention can be understood by the following description, and become apparent with reference to embodiments of the present invention. Also, it is obvious to those skilled in the art to which the present invention pertains that the aspects and advantages of the present invention can be realized by the means as claimed and combinations thereof.

In accordance with an embodiment of the present invention, a method of controlling a hybrid vehicle in case of slip of an MHSG drive belt, the hybrid vehicle including an MHSG, an engine, and an MHSG drive belt connecting them, includes determining an amount of torque assistance or an amount of regenerative braking according to the MHSG while the vehicle travels, instructing the MHSG to generate a desired amount of torque, based on the amount of torque assistance or the amount of regenerative braking, detecting an output torque from the MHSG to compare the output torque with the desired amount of torque, and determining that slip occurs in the MHSG drive belt when a difference between the actual torque and the desired amount of torque exceeds a preference value, and performing control for slip prevention.

The control for slip prevention may be performed by correcting the amount of torque assistance required for torque assistance or the amount of regenerative braking required for regenerative braking until it is determined that no slip occurs.

When the difference between the actual torque and the desired amount of torque is equal to or less than the preference value, torque assistance or regenerative braking may be performed based on the desired amount of torque.

The method may further include determining whether an engine coolant temperature exceeds a reference value and a predetermined time elapses after driving of the engine, when the MHSG drive belt is determined to slip, and determining that the slip occurs due to deterioration of the MHSG drive belt, when it is determined that the engine coolant temperature exceeds the reference value and the predetermined time elapses after driving of the engine.

The method may further include determining whether an engine coolant temperature exceeds a reference value and a predetermined time elapses after driving of the engine, when the MHSG drive belt is determined to slip, and determining that the slip occurs due to driving of the engine in a cold state, when it is determined that the engine coolant temperature does not exceed the reference value and the predetermined time does not elapse after driving of the engine.

When the slip is determined to occur due to the deterioration of the MHSG drive belt, a voice message may be output through a speaker installed in the vehicle or a text message may be output on a screen such as an instrument panel installed in the vehicle, so as to inform a driver that the MHSG drive belt is deteriorated, and a diagnostic trouble code (DTC) related to the same may be stored in a storage device in the vehicle.

BRIEF DESCRIPTION OF THE DRAWINGS

FIG. 2 is a diagram schematically illustrating a hybrid vehicle control system according to an embodiment of the present invention.

FIGS. 3A and 3B illustrate a process for controlling a hybrid vehicle according to an embodiment of the present invention.

DETAILED DESCRIPTION

Figure 1:
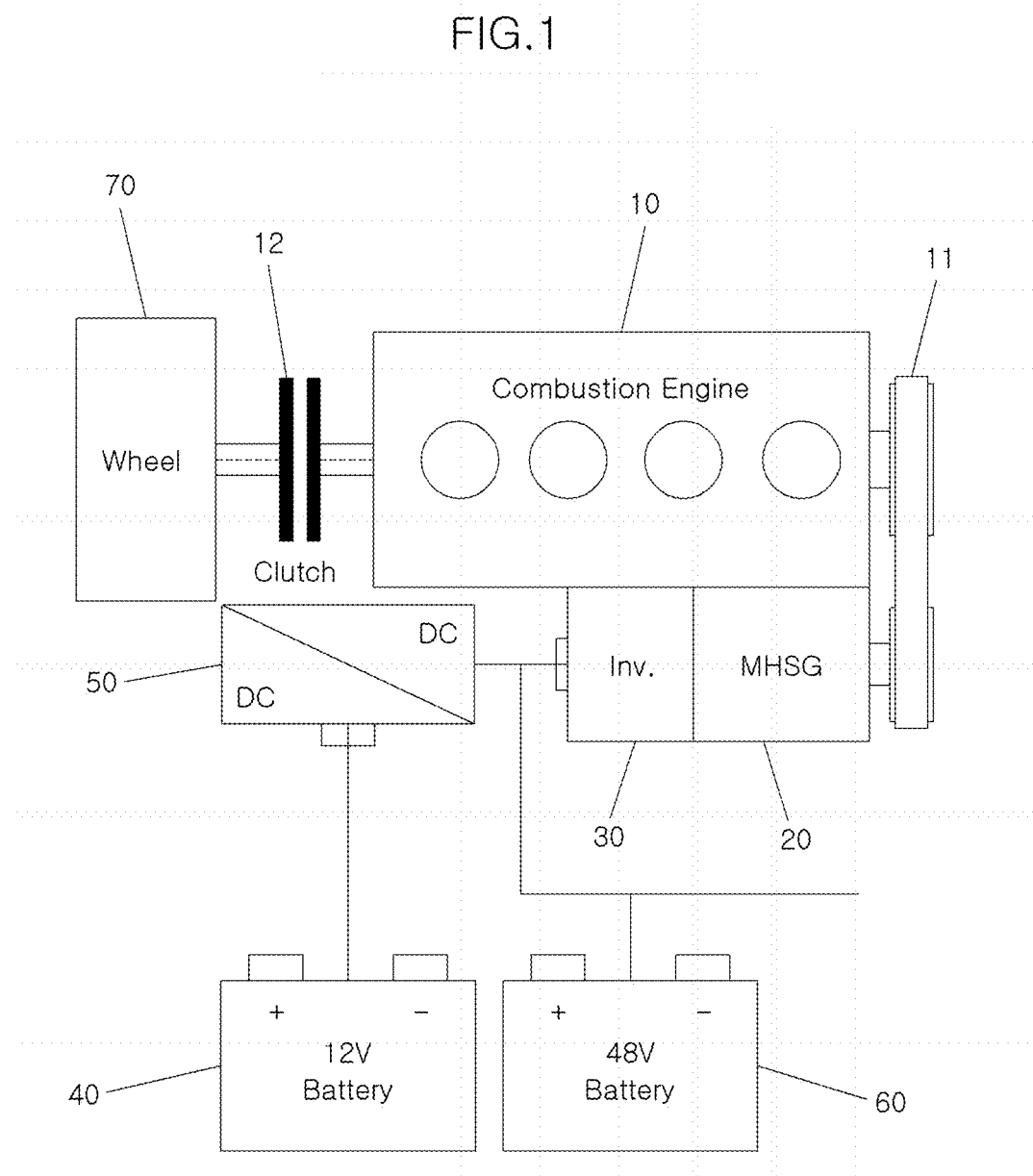
FIG. 1 is a diagram schematically illustrating a charging apparatus for a hybrid electric vehicle according to an embodiment of the present invention.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a method of controlling a mild hybrid vehicle in case of slip of an MHSG drive belt according to an embodiment of the present invention will be described in detail with reference to the accompanying drawings.

According to embodiments of the invention, driving force of a Mild Hybrid Starter Generator (MHSG) in a hybrid vehicle is transmitted to an engine, (or another wheel driving mechanism) of the vehicle using a drive belt. At least one controller of the vehicle controls the engine, MHSG, and other components of the vehicle to drive the vehicle with a desired torque. In embodiment, the desired torque is computed using input of the driver.

In embodiments, the at least one controller (periodically, continually) monitors an actual output torque (output torque of the MHSG, or torque delivered using the drive belt) using signals from at least one sensor installed in the vehicle. The controller (periodically, continually) compares the sensed output torque with the desired torque (expected torque). The controller detects a slip of the drive belt at least based on difference between the actual output torque and the desired torque is greater than a predetermined reference.

When a slip is detected, the controller collects information to determine whether the slip occurred due to deterioration of the MHSG drive belt. In embodiments, only when (1) temperature of an engine coolant (or coolant of wheel driving mechanism) exceeds a predetermined reference and (2) a predetermined time has elapsed after driving of the engine at the time of detected slip, it is determined that the detected slip occurred due to deterioration of the MHSG drive belt. When, it is determined that a slip occurred due to deterioration of the MHSG drive belt, the controller cause a display or a speaker of the vehicle to generate a warning to the driver about deterioration of the MHSG drive belt. In embodiments, when either of the two requirements (1) and (2) is not met, the controller continues to monitor an actual output torque of MHSG (or actual torque delivered) without causing a display or a speaker of the vehicle to generate a warning to the driver.

FIG. 1 is a diagram schematically illustrating a charging apparatus for a hybrid electric vehicle using a method of controlling a hybrid vehicle in case of slip of an MHSG drive belt according to an embodiment of the present invention. FIG. 2 is a diagram schematically illustrating a hybrid vehicle control system using the method of controlling a hybrid vehicle in case of slip of an MHSG drive belt according to an embodiment of the present invention.

As illustrated in FIG. 1, the charging apparatus for a mild hybrid electric vehicle, using the method of controlling a hybrid vehicle in case of slip of an MHSG drive belt according to an embodiment of the present invention, includes an engine 10, a mild hybrid starter generator (MHSG) 20 that generates AC power by driving the engine 10 or regenerative braking, an inverter 30 that converts the AC power generated by the MHSG 20 into DC power to supply the DC power to a battery or converts the DC power of the battery into AC power to supply the AC power to the MHSG 20, a high-voltage 48V battery 60 that is charged with the DC power supplied from the inverter 30 or supplies the DC power thereof to the inverter 30, a DC-DC converter 50 that manages a battery voltage and performs a voltage boost function, and a low-voltage 12V battery 40 that is charged with the DC power supplied from the DC-DC converter 50.

A crankshaft pulley of the engine 10 is connected to a motor output shaft pulley of the MHSG 20 by an MHSG drive belt 11. Accordingly, when the engine 10 is started, it is started by the driving force transmitted from the MHSG 20. On the other hand, after the engine 10 is started, it serves to supply power to the MHSG 20. In addition, a clutch 12 is provided between the engine 10 and a wheel 70 to switch power transmission.

When the engine 10 is started, the MHSG 20 serves as a starter that starts the engine by the power supplied from the high-voltage 48V battery 60 through the inverter 30. After the engine 10 is started, the MHSG 20 converts the rotational kinetic energy of the wheel 70 into electric energy to generate AC power when the vehicle decelerates, and the MHSG 20 assists the torque of the engine 10 using the driving force of the motor while the vehicle travels.

The inverter 30 converts the DC power of the high-voltage 48V battery 60 into AC power to supply the DC power to the MHSG 20 or converts the AC power generated by the MHSG 20 into DC power to supply the DC power to the high-voltage 48V battery 60 or the DC-DC converter 50.

The high-voltage 48V battery 60 supplies DC power to the inverter 30 when the engine 10 starts or at the time of engine torque assistance during traveling of the vehicle so as to enable the MHSG 20 to transmit driving force to the engine 10. Meanwhile, the high-voltage 48V battery 60 is charged when the AC power generated during regenerative braking is converted into DC power by the inverter 30. In addition, the high-voltage 48V battery 60 serves to supply its power to the low-voltage 12V battery 40 and/or an electrical system.

The DC-DC converter 50 is electrically connected to the inverter 30, the high-voltage 48V battery 60, and the electrical system. The DC-DC converter 50 drops a voltage of the DC power of the inverter 30 or the high-voltage 48V battery 60 so as to be within a charging voltage range of the low-voltage 12V battery 40, and supplies the voltage-dropped power to the low-voltage 12V battery 40 or the electrical system.

As illustrated in FIG. 2, the mild hybrid vehicle control system, using the method of controlling a hybrid vehicle in case of slip of an MHSG drive belt according to an embodiment of the present invention, further includes a hybrid control unit (HCU) 100 that performs the overall control of a mild hybrid device, an engine coolant temperature sensor 80 that detects a temperature of coolant for cooling the engine 10 to transfer information thereon to the HCU 100, and an MHSG torque detection unit 90 that detects a motor torque of the MHSG 20 to transfer information thereon to the HCU 100, in addition to the components illustrated in FIG. 1.

The HCU 100 determines a desired amount of torque for engine torque assistance and regenerative braking according to the MHSG 20, and instructs and controls the MHSG 20 to generate the desired amount of torque. In addition, as will be described later, the HCU 100 determines whether the MHSG drive belt 11 slips in response to detection result signals received from the engine coolant temperature sensor 80 and the MHSG torque detection unit 90, and controls an amount of torque assistance or an amount of regenerative torque so as to prevent the MHSG drive belt 11 from slipping.

Figure 3A:
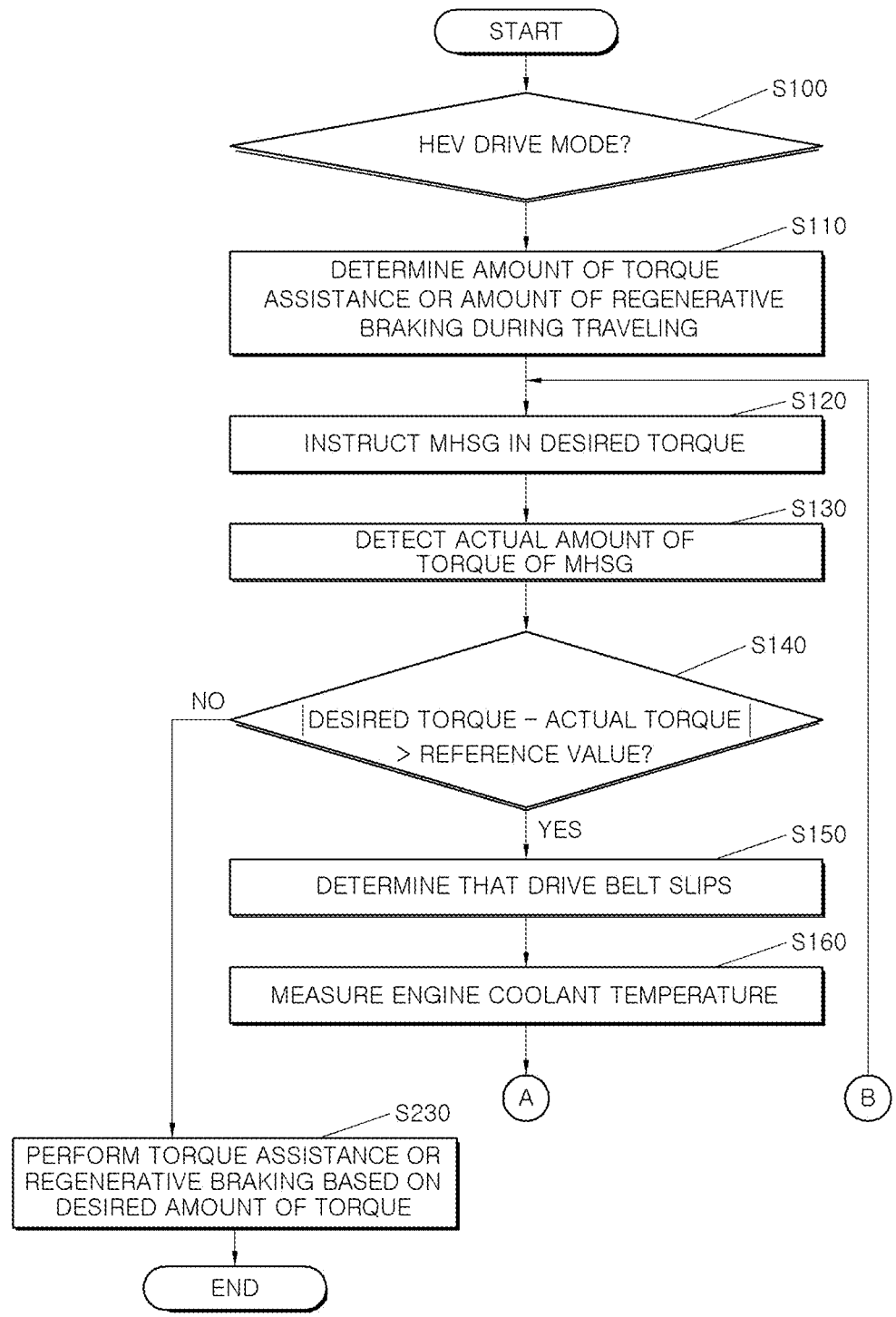

FIGS. 3A and 3B illustrates a process for controlling a mild hybrid vehicle in case of slip of an MHSG drive belt according to an embodiment of the present invention.

Referring to FIGS. 3A and 3B, the HCU 100 first determines whether the vehicle enters an HEV mode in which engine torque assistance or regenerative braking is performed using the motor torque of the MHSG 20 (S100).

When the vehicle enters the HEV mode, the HCU 100 determines the amount of torque assistance required to assist an engine torque by the MHSG 20 while the vehicle travels, or determines the amount of regenerative braking required to charge the high-voltage 48V battery 60 (S110). The HCU 100 determines a desired amount of torque from the motor of the MHSG 20 in order to accomplish the amount of torque assistance or the amount of regenerative braking, and outputs a control signal to the MHSG 20 so as to generate the desired amount of torque from the motor of the MHSG 20 (S120).

The MHSG 20 generates a torque corresponding to the desired amount of torque in response to the control signal received from the HCU 100. The torque output from the MHSG 20 is transferred to the engine 10 through the MHSG drive belt 11 that connects the motor output shaft of the MHSG 20 to the crankshaft pulley of the engine 10. However, if the MHSG drive belt 11 slips due to a difference between the driving torque of the MHSG and the torque of the crankshaft pulley in the HEV mode, the actual output torque from the MHSG 20 differs from the desired amount of torque determined by the HCU 100. The difference between the actual output torque and the desired amount of torque is increased as the slip is increased.

In view of the above fact in the present invention, the HCU 100 determines whether the difference between the actual output torque of the MHSG 20, which is detected by the MHSG torque detection unit 90, and the desired amount of torque exceeds a predetermined reference value (S140). When the difference between the actual output torque of the MHSG 20 and the desired amount of torque exceeds the predetermined reference value, the HCU 100 determines that the MHSG drive belt 11 slips (S150). If the difference between the actual output torque of the MHSG 20 and the desired amount of torque is within the predetermined reference value, the HCU 100 allows torque assistance or regenerative braking to be performed with the desired amount of torque maintained as it is (S230).

In embodiments of the present invention, when the MHSG drive belt 11 is determined to slip, the HCU 100 controls an output amount of torque from the MHSG 20 until the slip is removed by reducing the amount of torque assistance during torque assistance and reducing the amount of regenerative braking torque during regenerative braking (S190 and S200).

Meanwhile, in embodiments of the invention, when the MHSG drive belt 11 is determined to slip based on the difference between the actual output torque from the MHSG 20 and the desired amount of torque determined by the HCU 100, it is also determined whether the slip occurs due to deterioration of the MHSG drive belt 11 or due to engine friction by oil having low viscosity during cold starting. Particularly, a greater torque is applied to the MHSG drive belt 11 that connects the engine 10 to the MHSG 20, compared to another hybrid device in which a drive belt connects an alternator to an MHSG. Accordingly, the acceleration in deterioration of a belt due to frequent occurrence of torque assistance and regenerative torque causes problems relating to rapid belt deterioration, belt slip, noise, etc., and hence the belt needs to be replaced.

Accordingly, in embodiments of the present invention, when the MHSG drive belt 11 is determined to slip, information on coolant temperature and engine driving time is used to determine whether the slip occurs due to deterioration of the MHSG drive belt 11 or due to engine friction by oil having low viscosity during cold starting.

To this end, the HCU 100 first controls the engine coolant temperature sensor 80 to measure an engine coolant temperature, and receives information on the measured coolant temperature. (S160).

The HCU 100 determines whether the MHSG drive belt 11 slips due to deterioration thereof, based on the information on the engine coolant temperature and the information on elapsed time after the driving of the engine 10. Specifically, when the measured engine coolant temperature is less than a predetermined reference value and a predetermined time does not elapse after the driving of the engine 10, the engine 10 is determined to be in a cold situation. In this case, since it is impossible to check whether the slip of the belt due to motor torque assistance and regenerative braking occurs due to engine friction or deterioration, the slip is determined to occur due to engine friction during cold starting (S210). Through this process, the deterioration diagnosis condition is limited to be performed after the engine 10 is warmed up.

Meanwhile, when the measured engine coolant temperature is equal to or more than the predetermined reference value and the predetermined time elapses after the driving of the engine 10, the warm-up of the engine 10 is completed after the cold situation of the engine 10 passes. Therefore, in this case, the MHSG drive belt 11 is determined to slip due to deterioration thereof (S170).

When the MHSG drive belt 11 is determined to slip due to deterioration thereof, the HCU 100 corrects the output amount of torque from the MHSG 20 until the slip is removed by reducing the amount of torque assistance during torque assistance and reducing the amount of regenerative braking torque during regenerative braking, i.e. until the difference between the desired amount of torque and the actual output amount of torque of the MHSG 20 is within a predetermined range, in order to prevent the slip of the belt from occurring due to deterioration thereof (S190).

According to embodiments of the present invention, when the HCU 100 determines that the MHSG drive belt 11 slips due to deterioration thereof, a voice message is output through a speaker installed in the vehicle or a text message is output on a screen such as an instrument panel installed in the vehicle, so as to inform a driver that the MHSG drive belt 11 is deteriorated and thus needs to be replaced. Through this process, the driver may recognize occurrence of deterioration in the MHSG drive belt 11 to take proper actions such as replacement.

According to embodiments of the present invention, when the HCU 100 determines that the MHSG drive belt 11 slips due to deterioration thereof, a diagnostic trouble code (DTC) related to belt slip is stored in a storage device in the vehicle. Through this process, it is possible to easily diagnose causes of vibration and noise in the vehicle in a further maintenance process and to reduce vehicle maintenance cost.

When it is determined that the MHSG drive belt 11 slips in the cold situation, the HCU 100 corrects the output amount of torque from the MHSG 20 until the slip is removed by reducing the amount of torque assistance during torque assistance and reducing the amount of regenerative braking torque during regenerative braking according to the degree of slip, i.e. until the difference between the desired amount of torque and the actual output amount of torque of the MHSG 20 is within a predetermined range (S220).

When the difference between the desired amount of torque and the actual output amount of torque of the MHSG 20 is maintained within the predetermined range by correcting the desired amount of torque in steps S190 or S220, it is determined that the slip phenomenon is removed and the torque assistance or the regenerative braking is performed with the corrected desired amount of torque maintained (S230).

According to embodiments of the present invention, it is possible to surely remove the slip phenomenon by accurately diagnosing the slip of the MHSG drive belt 11 due to deterioration thereof and correcting the desired amount of torque of the MHSG 20 according to the result of diagnosis, and to inform the driver of whether the belt is deteriorated to take proper actions such as belt replacement.

In accordance with embodiments of the present invention, it is possible to effectively improve power performance and fuel efficiency that are essentially intended by an HEV in such a way to control a torque to accurately determine whether a drive belt slips and suppress the slip of the belt in a hybrid vehicle.

In addition, it is possible to provide comfortable driving sensitivity for a driver by rapidly removing a slip phenomenon and suppressing occurrence of noise and vehicle vibration in case of the belt slip. Furthermore, it is possible to suppress an increase in vehicle maintenance cost by preventing the vehicle from being erroneously maintained due to noise or vibration.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While the present invention has been described with respect to the specific embodiments, it will be apparent to those skilled in the art that various changes and modifications may be made without departing from spirit, aspects and scope of the invention.

What is claimed is:

1. A method of controlling a hybrid vehicle in case of slip of a Mild Hybrid Starter Generator (MHSG) drive belt, the hybrid vehicle comprising an MHSG, an engine, and an MHSG drive belt connecting them, the method comprising:
   determining an amount of torque assistance or an amount of regenerative braking according to the MHSG while the vehicle travels;
   instructing the MHSG to generate a desired amount of torque, based on the amount of torque assistance or the amount of regenerative braking;
   detecting an output torque from the MHSG to compare the output torque with the desired amount of torque; and
   determining that slip occurs in the MHSG drive belt when a difference between the actual torque and the desired amount of torque exceeds a preference value, and performing control for slip prevention.

2. The method of claim 1, wherein the control for slip prevention is performed by correcting the amount of torque assistance required for torque assistance or the amount of regenerative braking required for regenerative braking until it is determined that no slip occurs.

3. The method of claim 1, wherein when the difference between the actual torque and the desired amount of torque is equal to or less than the preference value, torque assistance or regenerative braking is performed based on the desired amount of torque.

4. The method of claim 1, further comprising:
   determining whether an engine coolant temperature exceeds a reference value and a predetermined time elapses after driving of the engine, when the MHSG drive belt is determined to slip; and
   determining that the slip occurs due to deterioration of the MHSG drive belt, when it is determined that the engine coolant temperature exceeds the reference value and the predetermined time elapses after driving of the engine.

5. The method of claim 1, further comprising:
   determining whether an engine coolant temperature exceeds a reference value and a predetermined time elapses after driving of the engine, when the MHSG drive belt is determined to slip; and
   determining that the slip occurs due to driving of the engine in a cold state, when it is determined that the engine coolant temperature does not exceed the reference value and the predetermined time does not elapse after driving of the engine.

6. The method of claim 4, wherein, when the slip is determined to occur due to the deterioration of the MHSG drive belt, a voice message is output through a speaker installed in the vehicle or a text message is output on a screen such as an instrument panel installed in the vehicle, so as to inform a driver that the MHSG drive belt is deteriorated, and a diagnostic trouble code (DTC) related to the same is stored in a storage device in the vehicle.

7. A non-transitory computer readable storage medium storing computer-executable instructions for implementing the method of claim 1.

* * * * *